F. P. IANNARONE.
Car Coupling.

No. 202,109.  Patented April 9, 1878.

UNITED STATES PATENT OFFICE.

FRANK P. IANNARONE, OF WASHINGTON, DISTRICT OF COLUMBIA.

IMPROVEMENT IN CAR-COUPLINGS.

Specification forming part of Letters Patent No. 202,109, dated April 9, 1878; application filed July 24, 1877.

*To all whom it may concern:*

Be it known that I, FRANK P. IANNARONE, of Washington, in the District of Columbia, have invented certain new and useful Improvements in Car-Couplings; and I do hereby declare that the following is a full and exact description thereof, reference being had to the accompanying drawings, making a part of this specification.

My invention relates to certain new and useful improvements in that class of car-couplers known as "self-couplers."

It has for its object economy of construction, durability, and simplicity in operation.

With these objects in view, my invention consists, generally, of a pair of spring-hook catches, arranged upon one platform, in combination with a single spear-headed coupler upon the adjacent platform, adapted to pass within and become locked between the spring-hooks automatically upon approaching one another, and adapted to be released by a quarter-turn of the spear-headed coupler upon its horizontal axis, as will be presently explained.

My invention further consists in the special features of construction of the several parts, as will be hereinafter more fully explained.

To enable others to make and fully understand my improved coupler, I will proceed to describe the same, referring by letters to the accompanying drawings, in which—

Figure 1:
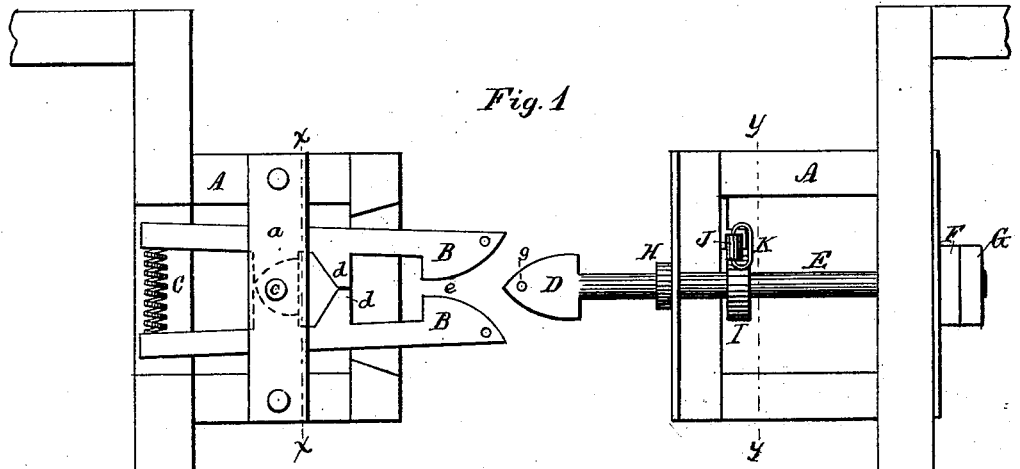
Figure 2:
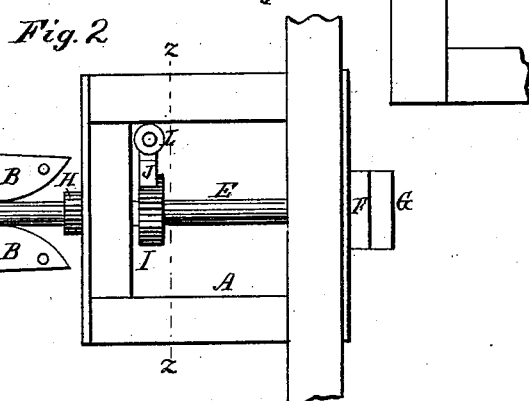
Figure 3:
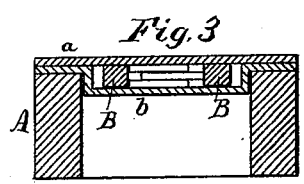
Figure 4:
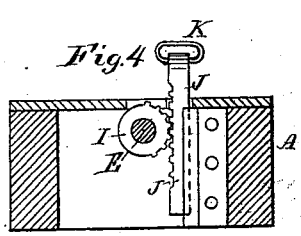
Figure 5:
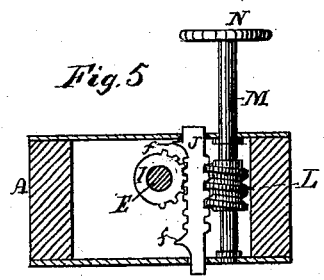

Figure 1 is a top view of the approaching ends of two cars with the flooring removed, and exposing to view the coupling devices. Fig. 2 is a similar view, showing the spear-headed coupler in the position assumed to be released. Fig. 3 is a vertical section at the line $x\,x$ of Fig. 1; Fig. 4, a similar section at the line $y\,y$ of Fig. 1, and Fig. 5 is a similar section at the line $z\,z$ of Fig. 2.

Similar letters indicate like parts in the several figures.

A A represent the platform-frames of two cars approaching each other to be coupled. Within one platform are two hooks, B B, pivoted near their center between two plates, $a$ $b$, and adapted to turn individually or collectively upon the pivot $c$. The rear ends of said hooks are kept in a separated or distended position by means of a coiled-rubber or other suitable spring, C, and the approach of the forward hook ends is stopped by means of the inwardly-projecting ears $d\,d$, in order that a suitable space, $e$, may be always maintained for the releasement of the spear-headed coupler, as will be presently explained.

D is a spear-headed coupler, secured within the platform of the adjacent car. This coupler has a round or other shaped shank, E, extending backward, and provided with a suitable spring, F, and confining-nut G, to hold the same in proper relation to the platform. A collar, H, prevents this coupler from being forced backwardly, while the spring F tends to hold said collar in close contact with the front edge plate of said platform.

Arranged upon the shank E, just in rear of the front cross-piece of the platform, is a mutilated pinion, I, one side of whose periphery is provided with teeth, meshing with a vertical rack, J, the number and relation of the teeth in the rack and pinion being such that just a one-quarter turn may be given to the shank E by the vertical movement of the rack. The arrangement of this rack and pinion is more clearly seen at Fig. 4. In this view the vertical rack J is shown provided at its upper end, above the platform-floor, with a suitable hand-hold or ring, K, by which the rack is lifted to cause the rotation of the pinion I and the shank E, to which it is secured.

It will therefore be observed that, if the rack J be raised, the pinion and shank will be rotated and the spear-head assume the position seen at Fig. 2, which is a right angle to that necessary to form a secure coupling with the adjacent car, and rendering it capable of being withdrawn from between the hooks B B through the space $e$. The distance the rack travels and the amount of rotation of the pinion I are regulated by the number and size of the teeth therein. The mutilated portion of the pinion, as soon as it comes in contact with the vertical plain side of the rack-bar, will necessarily come to a stop; but as constant use would induce to wear, and as it is essentially important that the predetermined movement of the rack and pinion shall always remain the same, in order that the spear-head D shall be turned at exact right angles to couple and uncouple, I provide the double rack, as shown at Fig. 5, and provide it with offsets or stops $ff$, which, coming in contact with the mutilated portion of the pinion I, stop the movement in either direction of the said rack and pinion. The opposite side of said rack-bar is also formed with teeth, gearing with a worm, L, on a vertical rotating shaft, M, provided with a wheel, N, to turn said shaft, after the fashion of a brake-lever. This worm serves to raise and lower the double rack, and consequently turn the spear-head D in the position shown at Fig. 1, or into the position seen at Fig. 2 for uncoupling.

The spear-head D is bifurcated or slotted horizontally a suitable depth, as indicated at Fig. 2, and is provided with a vertical coupling-pin hole, $g$, adapted to receive the ordinary link and coupling-pin, should it become necessary or advisable for connecting or coupling the car with an old-fashioned link-coupling or with the Miller coupling, which has suitable means for connection with ordinary cars.

The operation of my improved coupler is as follows: The rack J being forced down to its lowest position, the spear-head assumes the position shown at Fig. 1, and, approaching the adjacent car, provided with the hooks B B, forces them apart, and entering between the same until the shoulders of the spear and hooks shall have passed each other, when the spring C immediately closes the hooks B B behind the spear-head D, and securely locks or couples the cars together against accidental disengagement.

When it is desirable to uncouple the cars, the rack J is raised by the handle K or vertical rotating bar M, which causes the shank E, through the medium of the pinion I, to be rotated just sufficiently to bring the spear-head into a position at right angles to its coupling position, and as clearly seen at Fig. 2. The thickness of the head being just equal to the space $e$, it can freely pass through the same, the lugs or ears $d\ d$ serving to prevent said space from varying.

What I claim as my invention, and desire to secure by Letters Patent, is—

1. In combination with the grasping-hooks B B, the spear-headed coupler D E, provided with mutilated gear I and rack J, substantially as and for the purposes set forth.

2. The hooks B B, adapted to vibrate toward and from each other, and having formed thereon stops $d\ d$, approaching and abutting against each other, for maintaining a given space, $e$, for the passage of the spear-head in uncoupling, as hereinbefore set forth.

3. In combination with the spear-head D and its shank E, the rack J and mutilated gear I, substantially as and for the purposes described.

4. The rack J, provided with stops $ff$, substantially as and for the purpose hereinbefore set forth.

5. The combination of the rack J, pinion I, and worm-shaft M L, constructed and operating substantially as and for the purposes described.

Witness my hand this 18th day of July, A. D. 1877.

F. P. IANNARONE.

Witnesses:
JNO. J. BONNER,
FRANK PHILLIPS.